United States Patent

Ito et al.

[11] Patent Number: 5,792,395
[45] Date of Patent: Aug. 11, 1998

[54] PLASTICIZATION CONTROL METHOD FOR AN INJECTION MOLDING MACHINE

[75] Inventors: Susumu Ito; Katsuyuki Yamanaka, both of Oshino-mura, Japan

[73] Assignee: Fanuc Ltd., Yamanashi, Japan

[21] Appl. No.: 406,868

[22] PCT Filed: Jul. 13, 1994

[86] PCT No.: PCT/JP94/01151

§ 371 Date: Mar. 23, 1995

§ 102(e) Date: Mar. 23, 1995

[87] PCT Pub. No.: WO95/03161

PCT Pub. Date: Feb. 2, 1995

[30] Foreign Application Priority Data

Jul. 23, 1993 [JP] Japan .................. 5-201989

[51] Int. Cl.[6] .................. B29C 45/50
[52] U.S. Cl. .................. 264/40.1; 264/40.5; 264/328.1; 425/145
[58] Field of Search .................. 284/40.1, 40.5, 284/328.1; 426/145, 207, 208, 209; 364/476

[56] References Cited

U.S. PATENT DOCUMENTS

| | | | |
|---|---|---|---|
| 4,820,464 | 4/1989 | Sasaki et al. | 264/40.1 |
| 4,847,023 | 7/1989 | Neko | 264/40.1 |
| 4,968,462 | 11/1990 | Hara | 264/40.1 |
| 5,002,708 | 3/1991 | Inaba et al. | 264/40.1 |
| 5,023,028 | 6/1991 | Kamiguchi et al. | 264/40.1 |
| 5,102,578 | 4/1992 | Kumamura et al. | 264/40.1 |
| 5,251,146 | 10/1993 | Neko et al. | 364/476 |
| 5,296,179 | 3/1994 | Kamiguchi et al. | 264/40.1 |
| 5,342,559 | 8/1994 | Kamiguchi et al. | 264/40.1 |
| 5,494,623 | 2/1996 | Miyahara | 264/40.1 |

FOREIGN PATENT DOCUMENTS

| | | |
|---|---|---|
| 54-021459 | 2/1979 | Japan . |
| 61-024423 | 2/1986 | Japan . |
| 62-231716 | 10/1987 | Japan . |
| 1-188316 | 7/1989 | Japan . |
| A 01-188316 | 7/1989 | Japan . |
| 1-196322 | 8/1989 | Japan . |
| 2-142017 | 11/1990 | Japan . |

*Primary Examiner*—Long V. Le
*Attorney, Agent, or Firm*—Staas & Halsey

[57] ABSTRACT

A plasticization control method for an injection molding machine in which the plasticized state of resin in an injection cylinder is controlled in measuring based on the detected rotating force of a screw. A reference screw rotating force C or F required for desired measuring operation is determined. Using the reference screw rotating force C or F as a reference, upper and lower limits D and E of an allowable screw rotating force range, in which measuring can be performed normally, are set for each of screw positions, and then stored as an allowable value file. The rotating force V acting on the screw during measuring operation is successively detected. If the rotating force V is not between the upper and lower limits D and E of the allowable range relating to the current position of the screw, it is judged that plasticization is abnormal and an abnormality alarm is outputted. Thus, insufficient heating of the injection cylinder, intrusion of foreign matter in the molding material, insufficient supply of resin, etc. can surely be detected.

8 Claims, 4 Drawing Sheets

| ADDRESS (i) | SCREW POSITION (Xi) | LOWER LIMIT TORQUE (Li) | UPPER LIMIT TORQUE (Ui) |
|---|---|---|---|
| 1 | X1 | L1 (0) | U1 (f) |
| 2 | X2 | L2 (d) | U2 (f) |
| 3 | X3 | L3 (c) | U3 (f) |
| 4 | X4 | L4 (c) | U4 (d) |
| ⋮ | ⋮ | ⋮ | ⋮ |

PLASTICIZATION CONTROL METHOD FOR AN INJECTION MOLDING MACHINE

TECHNICAL FIELD

The present invention relates to a plasticization control method for an injection molding machine in which resin in an injection cylinder is plasticized and measured by rotating a screw thereof.

BACKGROUND ART

There is known an injection molding machine in which a screw disposed in an injection cylinder is rotated at a preset rotational speed for measuring. In the conventional injection molding machine, only the speed of a motor for rotating the screw is preferentially controlled, and the driving torque of the motor is automatically controlled so as to rotate the screw at the set speed by compensating the viscous resistance of resin acting on the screw, various disturbances, etc.

When the injection cylinder is insufficiently heated or foreign material is mixed in the resin, the driving torque of the motor for rotating the screw at the set speed inevitably increases. In the conventional injection molding machine, however, variation of the driving torque of the motor is not taken into account, and insofar as the screw is rotated at the set speed, an abnormal state, such as insufficient heating of the injection cylinder and intrusion of foreign material, cannot be detected by a control system of the motor. Furthermore, when the supply of resin to the injection cylinder is insufficient, the screw rotates more lightly and the driving torque of the motor inevitably decreases. In this case, as the screw rotates easier at the set speed, no abnormality is found with respect to the rotational speed of the screw. Thus, an abnormal state due to the insufficient supply of resin cannot be detected by the motor control system.

In some cases, the screw is rotated with a very large force exceeding its practical strength in order to attain a target rotational speed in accordance with measuring conditions such as the screw rotational speed, back pressure and the kind of resin used. Especially, when the maximum output torque of the motor exceeds the practical strength of the screw, the screw may possibly be broken. This is the case with the situation where screws with different diameters are alternately used. For example, when the screw used is replaced with a screw of a smaller diameter and measuring is carried out with the screw of a smaller diameter, the replaced screw may possibly be broken. In such a case, the maximum output torque of the motor must be restricted, for example, by resetting a torque limit in the control system, but the resetting operation is complicated. Conversely, in the cases where the set rotational speed cannot be attained even though the screw is driven with a maximum output torque of the motor, inaccurate measuring may result or the measuring itself becomes impossible. In some cases, the motor may be overheated.

It is desirable for the user of the injection molding machine to carry out its injection molding operation at the lowest possible running cost, insofar as molded products are of equal quality. It is also desirable for the user to optimize measuring conditions. It is, however, difficult to separately detect the electric power or electric energy used for the measuring. Therefore, it is not possible to know the variations of the running cost due to difference of measuring conditions.

SUMMARY OF THE INVENTION

An object of the present invention is to surely detect the plasticized state of resin during measuring on the basis of the rotating force of a screw, thereby avoiding breakdown of the screw as well as overheating of a motor, and permitting measuring to be properly carried out in consideration of electric power required for the measuring.

A plasticization control method of the present invention comprises the steps of: determining a reference screw rotating force as a reference of rotating force of a screw during measuring operation; setting and storing an allowable range with respect to the reference screw rotating force; successively detecting the rotating force of the screw and determining whether or not the detected rotating force is within the allowable range during execution of the measuring operation; and outputting an abnormality detection signal when the rotating force of the screw deviates from the allowable range.

In the case where the measuring is carried out with the screw rotational speed varied in accordance with the position of the screw in an injection cylinder, the reference screw rotating force and the allowable range are set for each of the screw positions with respect to the injection cylinder, and it is determined whether the screw rotating force is within the allowable range at the current position of the screw.

The reference screw rotating force can be obtained either through calculation based on measuring conditions including the shape and dimensions of the screw used, the kind of resin used, etc., or by actually measuring the screw rotating force by tentative measuring.

In the case of obtaining the reference screw rotating force through calculation based on the measuring conditions, the allowable range of screw rotating force is set so that an upper limit of the allowable range is smaller than or equal to an applicable screw rotating force, thereby preventing breakdown of the screw.

In the case of carrying out tentative measuring, an applicable screw rotating force corresponding to the strength of the screw is previously obtained, and a screw rotating force, which is obtained in measuring operation with the screw rotating force restricted to the applicable screw rotating force or less, is set as the reference screw rotating force.

Further, the driving current of a motor for rotating the screw is detected so that the amount of electric power consumption or an average of electric power consumption during one molding cycle is obtained and visually displayed to permit the operator to learn the electric power required for the measuring. When the average driving current value during one molding cycle exceeds the rated continuous current value of the motor, an overheating prediction signal is outputted.

When the overheating prediction signal is outputted, the molding operation is performed based on the molding cycle time plus a waiting time, whereby the substantial average driving current is brought to a value smaller than the rated continuous current value of the motor to prevent the overheating of the motor.

DESCRIPTION OF THE PREFERRED EMBODIMENTS

Figure 1:
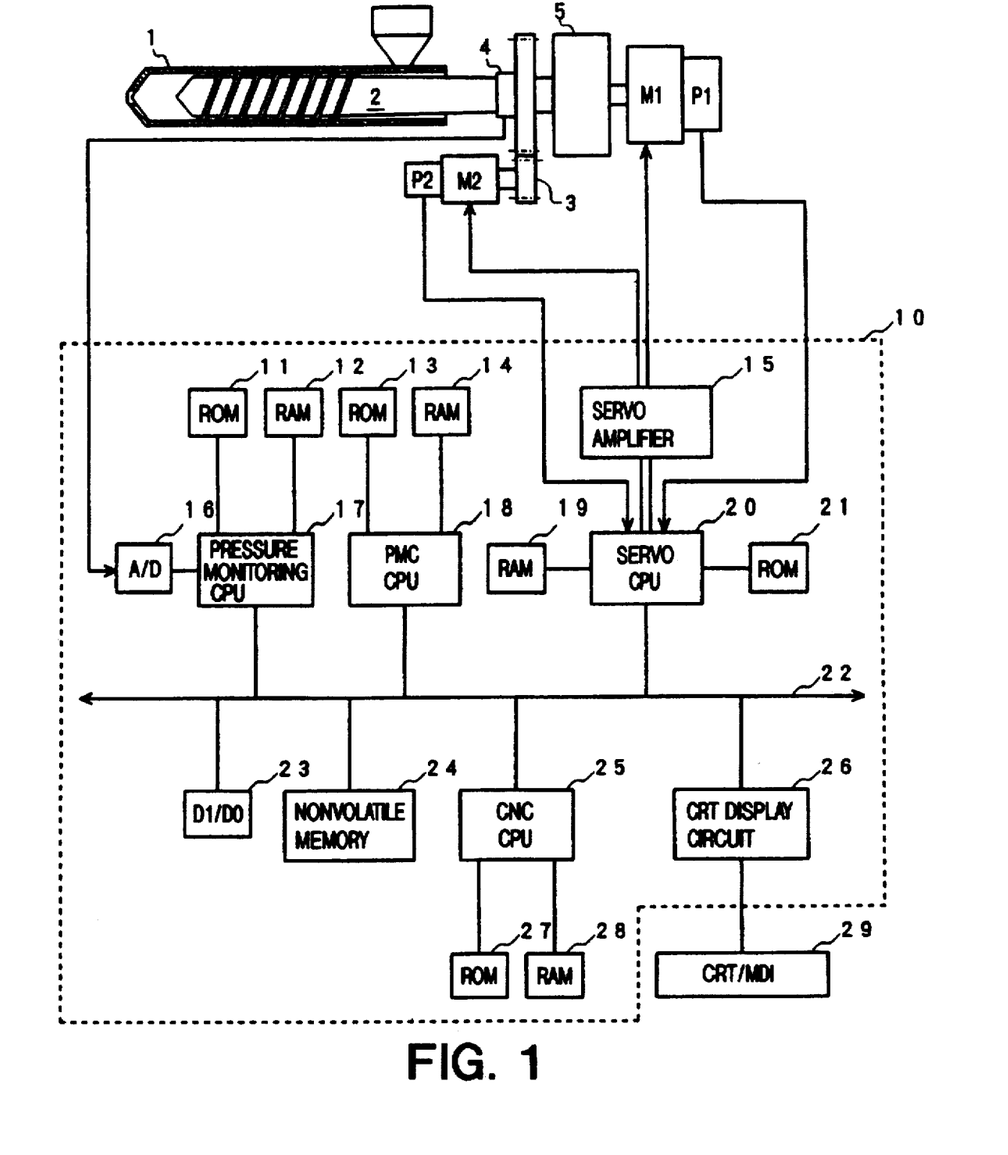
FIG. 1 is a block diagram showing a principal part of an injection molding machine for carrying out the method of the present invention.

Referring to FIG. 1, a screw 2 disposed in an injection cylinder 1 is moved in the axial direction of the cylinder 1 by the driving force of an injection servomotor M1, and is rotated for plasticization and measuring of resin by the driving force of a screw rotating servomotor M2. A driving-force converter 5 converts rotation of the output shaft of the injection servomotor M1 to linear motion in the direction of injection axis, and a gear mechanism 3 transmits rotation of the screw rotating servomotor M2 to the screw 2. A pressure detector 4 is arranged at a proximal part of the screw 2 and detects a resin pressure acting in the axial direction of the screw 2, that is, an injection dwell pressure during an injection dwell operation and a back pressure of the screw during measuring and kneading operation. The injection servomotor M1 is provided with a pulse coder P1 for detecting the position and moving speed of the screw 2, and the screw rotating servomotor M2 is provided with a speed detector P2 for detecting the rotational speed of the screw 2.

A control device 10 for the injection molding machine includes a CNC CPU 25 which is a microprocessor for numerical control, a PMC CPU 18 which is a microprocessor for a programmable machine controller, a servo CPU 20 which is a microprocessor for servo control, and a pressure monitoring CPU 17 for sampling the injection dwell pressure or the screw back pressure through an A/D converter 16. Information is transferred among these microprocessors through mutual input and output of data via a bus 22.

The PMC CPU 18 is connected to a ROM 13 storing a sequence program for controlling a sequential operation of the injection molding machine, a control program for determining whether an abnormal plasticization has occurred, etc., and a RAM 14 used for temporary storage of calculation data, etc. The CNC CPU 25 is connected to a ROM 27 storing a program for globally controlling the injection molding machine, etc., and a RAM 28 used for temporary storage of calculation data, etc.

The servo CPU 20 is connected to a ROM 21 storing a control program devoted to servo control, and a RAM 19 for temporary storage of data, while the pressure monitoring CPU 17 is connected to a ROM 11 storing a control program for the sampling processing for obtaining pressure data etc., and a RAM 12 for temporary storage of data. The servo CPU 20 is further connected to a servo amplifier 15, which drives, based on commands from the CPU 20, the injection servomotor M1, the screw rotating servomotor M2 and other servomotors for clamping the mold and ejecting the products. In FIG. 1, the block 15 represents the servo amplifiers associated with the respective servomotors. An output of the pulse coder P1 mounted on the injection servomotor M1 and an output of the speed detector P2 mounted on the screw rotating servomotor M2 are fed back to the servo CPU 20. A current position of the screw 2 calculated by the servo CPU 20 based on the feedback pulse from the pulse coder P1, a rotational speed of the screw 2 detected by the speed detector P2, and a value of driving current (not shown) fed back from the screw rotating servomotor M2 are stored, respectively, in a current position register, current speed register and driving current register of the memory 19.

An interface 23 serves as an input/output interface for receiving signals from a control panel and limit switches arranged at various portions of the injection molding machine, and for transmitting various commands to peripheral devices of the injection molding machine. A manual data input device 29 with a display is connected to the bus 22 via a CRT display circuit 26, permits selection of displays on the monitor screen and function menus, entry of various data, etc., and is provided with numeric keys for entry of numeric data, various function keys, etc.

A nonvolatile memory 24 serves as a molding data storage unit for storing molding conditions (injection dwell condition, measuring condition, etc.), various set values parameters, macro variables for the injection molding operation and a reference screw rotating force for detecting abnormal measuring.

With the arrangement described above, the CNC CPU 25 distributes pulses to servomotors for individual axes in accordance with the control program stored in the ROM 27, and the servo CPU 20 executes servo control such as position loop control, speed loop control and current loop control, in accordance with move commands distributed as pulses for the individual axes, and position and speed feedback signals obtained from detectors such as the pulse coder P1 and the speed detector P2, thereby carrying out a so-called digital servo processing.

In this embodiment, the pressure monitoring CPU 17 repeatedly executes the sampling processing for each injection dwell operation and the measuring-kneading operation. The CPU 17 detects the injection dwell pressure or screw back pressure acting on the screw 2 via the pressure detector 4 and the A/D converter 16, and stores the detected pressure associated with the current position of the screw 2 in each predetermined sampling period. Further, in the measuring operation, the driving current of the screw rotating servomotor M2, which corresponds to the screw rotating force, is also updated and stored in the RAM 12 in each sampling period.

Figure 4:
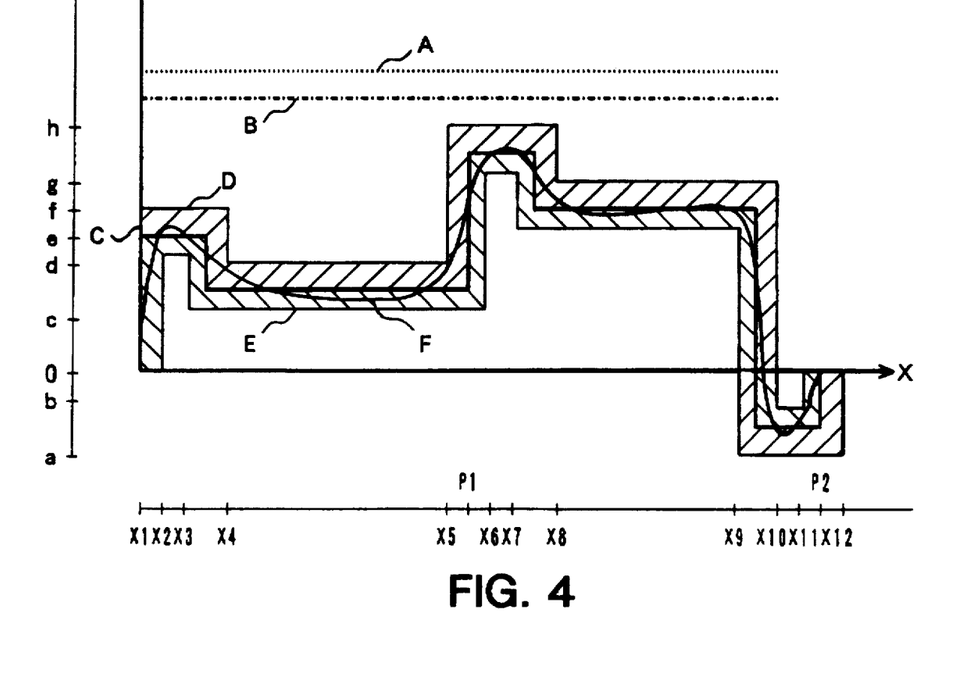
FIG. 4 is a schematic diagram illustrating a method for setting allowable ranges for a reference screw rotating force for abnormal measuring detection.

Referring now to FIG. 4, a method for setting the reference screw rotating force (torque) for controlling the measuring operation and an allowable range for detecting abnormal measuring will be explained.

In FIG. 4, a line C represents a reference screw rotating force related with the screw position, which is calculated based on measuring conditions including the shape and dimensions of the screw 2, the kind of the resin, the rotational speed of the screw, and the heating temperature of the injection cylinder. In this diagram, the vertical axis represents the screw rotating force, and the horizontal axis the screw position.

FIG. 4 illustrates the case wherein a screw rotational speed switching position P1 is set between a measuring start position X1 and a measuring completion position P2, and the screw rotational speed is changed from a low speed to a high speed at the switching position P1, whereby the whole measuring operation is divided into two stages. In the interval from the measuring start position X1 to the screw rotational speed switching position P1, the set value of screw rotational speed is fixed; therefore, the value of reference screw rotating force required in this interval basically remains the same, and can be obtained using a predetermined arithmetic expression. Similarly, in the interval from the screw rotational speed switching position P1 to the measuring completion position P2, the set value of screw rotational speed is fixed, and therefore, the value of reference screw rotating force required in this interval can also be obtained using the predetermined arithmetic expression. However, in the vicinity of the measuring start position X1 or the screw rotational speed switching position P1, the screw 2, which is at rest or rotated at low speed, must be accelerated up to the set screw rotational speed, and also in the vicinity of the measuring completion position P2, the rotating screw 2 must be decelerated and stopped. In these intervals, therefore, the required values of reference screw rotating force differ from those necessary for acquiring the set screw rotational speeds in the respective intervals. Specifically, in the vicinities of the measuring start position X1 and the screw rotational speed switching position P1, a reference screw rotating force greater than the screw rotating force for acquiring the set screw rotational speed for the first or second stage is required, and in the vicinity of the measuring completion position P2, a negative reference screw rotating force is required in order to decelerate and stop the rotating screw 2. These reference screw rotating forces and acceleration/deceleration times can also be obtained according to a predetermined arithmetic expression, based on the shape and dimensions of the screw 2, the kind of the resin used, the set screw rotational speed, the set heating temperature of the injection cylinder 1, acceleration/deceleration characteristics of the screw rotating servomotor M2, etc.

In FIG. 4, a line A represents a screw breakdown torque value calculated based on of the strength of material, which is based on the material, shape, dimensions, etc. of the screw 2. A value B of applicable screw rotating force is set to a level slightly lower than the line A, taking safety into account.

In the case where the value C of reference screw rotating force is computed using the arithmetic expression, the operator sets a upper limit D and a lower limit E for defining the allowable ranges above and below the reference screw rotating force C with appropriate margins. For a region where the upper limit D exceeds the value B of applicable screw rotating force, the upper limit D is reset so that it is always kept smaller than or equal to the applicable screw rotating force B. The correlation between the upper and lower limits D and E of the allowable range and the screw position is stored in an allowable value storage file of the nonvolatile memory 24 of the control device 10 through operation of the numeric keys of the manual data input device 29.

Figure 5:
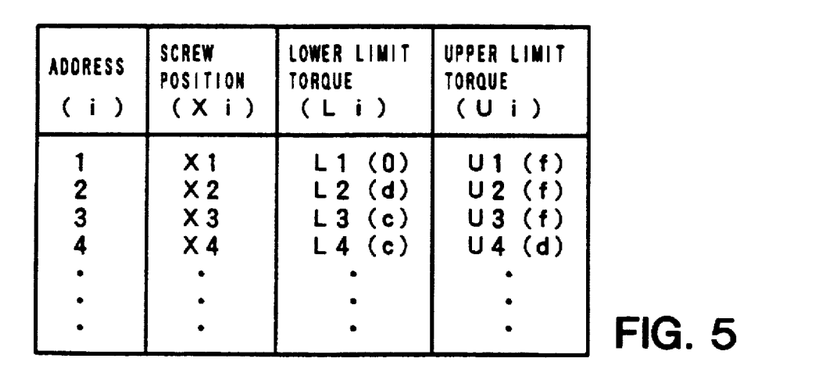
FIG. 5 is a schematic diagram showing the arrangement of an allowable value storage file in the control device.

FIG. 5 is a schematic diagram illustrating contents of the allowable value storage file, which corresponds to the example of settings shown in FIG. 4. For example, stored at the first address of the allowable value storage file are an L1 value 0 as the lower limit E of the allowable range for the interval between the screw positions X1 and X2, and a U1 value f as the upper limit D of the allowable range for the same interval X1–X2. Similarly, stored at the second address of the allowable value file are an L2 value d as the lower limit E for the interval between the screw positions X2 and X3, and a U2 value f as the upper limit D for the same interval X2–X3.

In the case where it is difficult to obtain by the arithmetic expression the value C of reference screw rotating force necessary for the measuring, the reference screw rotating force can be determined in the manner described below. A torque limit for the screw rotating servomotor M2 is set in the control device 10 of the injection molding machine, to thereby restrict the upper limit of the rotating force of the screw 2 to the value B of applicable screw rotating force, and actual measuring operation is carried out under predetermined measuring conditions including the set screw rotational speed and set heating temperature. The correlation between the driving current of the screw rotating servomotor M2 (reference screw rotating force required for the measuring) and the screw position, both sampled during normal measuring operation, is displayed as a line F (see FIG. 4) on the display screen of the manual data input device 29, thus enabling the operator to learn the correlation between the value F of reference screw rotating force and the screw position. Then, the upper and lower limits D and E of the allowable range are determined and stored in the allowable value storage file, in the same manner as described above.

Electric energy W consumed by the screw rotating servomotor M2 during a measuring operation of one molding cycle is given by $I^2 \cdot R \cdot T$, where R is the resistance of the winding of the servomotor M2; I is an average driving current value during the measuring operation fed back from the screw rotating servomotor M2; and T is the current supply time. In practice, the driving current value fed back from the screw rotating servomotor M2 is detected in each sampling period during measuring. Thus, provided the sampling period is $\tau$, the instantaneous driving current value detected in a present sampling period is Ii and the sampling processing is executed n times during the measuring of one molding cycle, the electric energy W consumed by the screw rotating servomotor M2 during the measuring of one molding cycle is given by the following equation (1):

$$W = I^2 \cdot R \cdot T \qquad (1)$$
$$= \sum_{i=1}^{n} (Ii^2 \cdot R \cdot \tau)$$
$$= R \cdot \tau \cdot \sum_{i=1}^{n} Ii^2$$

Average electric power consumption Q consumed by the screw rotating servomotor 2 during one molding cycle is given by $Ic^2 \cdot R$, where Ic is an average driving current value during one molding cycle. Also, the average power consumption Q can be obtained by dividing the aforementioned electric energy W by a cycle time Tc of one molding cycle. Accordingly, Q can be expressed by the following equation (2):

$$Q = Ic^2 \cdot R \qquad (2)$$
$$= W/Tc$$
$$= R \cdot \tau \cdot \sum_{i=1}^{n} Ii^2/Tc$$

From equation (2), the average driving current Ic of the servomotor M2 during one molding cycle can be expressed by the following equation (3):

$$Ic = \left( \tau \cdot \sum_{i=1}^{n} Ii^2/Tc \right)^{1/2} \qquad (3)$$

Here, provided a rated continuous current value of the servomotor M2 is Arat, in order to prevent the servomotor M2 from overheating, the average driving current value Ic of the servomotor M2 during one molding cycle must be smaller than or equal to Arat, and thus the following expression (4) must be satisfied:

$$\left( \tau \cdot \sum_{i=1}^{n} Ii^2/Tc \right)^{1/2} \leq Arat \qquad (4)$$

Thus, in the case where the subsequent molding cycle is started immediately after the measuring operation is completed, that is, where the cycle time Tc of one molding cycle is set to a time period required from the start of mold closing to completion of the ejection of a molded product, it is necessary to output an overheating prediction signal at the time when the expression (4) becomes unsatisfied for suspending the molding cycle.

However, that is the case where the cycle time Tc of one molding cycle is set to the time period required from the start of mold closing to completion of the ejection of a molded product. If the average driving current Ic can be lowered to a value substantially smaller than or equal to Arat by setting the cycle time Tc of one molding cycle to a period longer than the time period required from the start of mold closing to completion of the ejection of a molded product, the overheating can be prevented even though the molding cycle is repeated. To prolong the cycle time Tc of one molding cycle, an operation halt time Toff of a required length may be provided following completion of the ejection of a molded product which is the final step of one molding cycle, for example, thereby delaying the start of the subsequent molding cycle.

Given the cycle time Tc of one molding cycle is set to a cycle time Tadd which is the sum of the time period required from the start of mold closing to completion of the ejection of a molded product and the operation halt time Toff, then the following expression (5) is derived:

$$\left( \tau \cdot \sum_{i=1}^{n} Ii^2/Tadd \right)^{1/2} \leq Arat \quad (5)$$

Solving the expression (5) for Tadd provides expression (6).

$$Tadd \geq \tau \cdot \sum_{i=1}^{n} Ii^2/Arat^2 \quad (6)$$

Specifically, if the required cycle time Tadd is set to a value such that expression (6) is satisfied, the substantial average driving current value Ic becomes smaller than or equal to Arat. Thus, by starting the subsequent molding cycle upon lapse of the operation halt time Toff after completion of the measuring operation, it is possible to prevent the screw rotating servomotor M2 from being overheated, without regard to the result of the determination based on expression (4).

Figure 2:
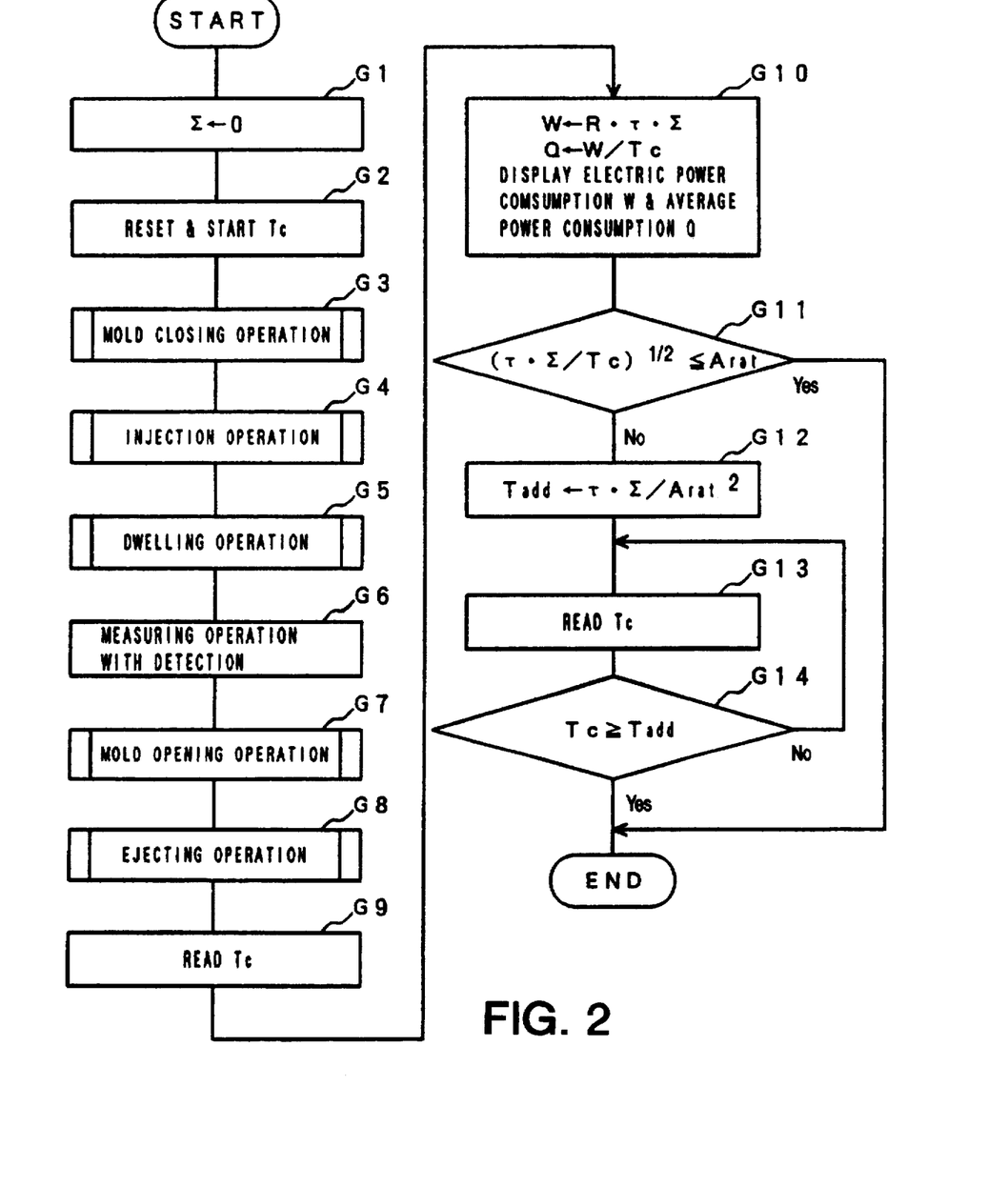
FIG. 2 is a flowchart showing an entire sequential processing to be executed by a control device of the injection molding machine shown in FIG. 1.
Figure 3:
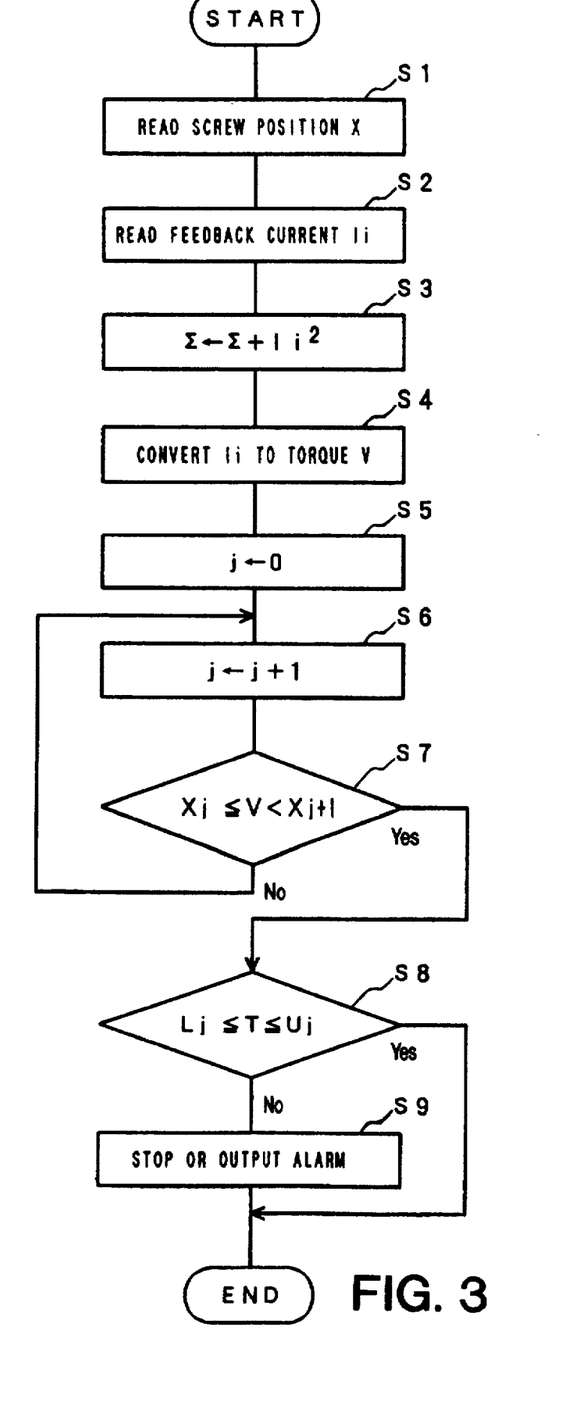
FIG. 3 is a flowchart showing an outline of processing of abnormal measuring detection.

Referring now to the flowcharts of FIGS. 2 and 3, a plasticization control method of this embodiment will be explained. FIG. 2 is the flowchart showing an entire flow of a sequential processing to be executed by the PMC CPU 18, and FIG. 3 is the flowchart showing an outline of an abnormal measuring detection processing to be repeatedly executed by the PMC CPU 18 in the measuring operation at the predetermined intervals τ in parallel with a process control similar to that known in the art.

First, on receiving a molding operation start command from the control panel arranged in the injection molding machine, the PMC CPU 18 initializes the value of a squared current value accumulating register Σ to "0" (Step G1), resets and then starts a cycle time measuring timer Tc to start measuring the time elapsed after the start of mold closing (Step G2), and causes the injection molding machine to carry out a mold closing operation, an injecting operation and a dwelling operation, as in a conventional machine, in cooperation with the CNC CPU 25 (Steps G3–G5).

Subsequently, the PMC CPU 18 causes the CNC CPU 25 to start operation control for the measuring step, and at the same time the PMC CPU 18 repeatedly executes the abnormal measuring detection processing shown in FIG. 3 at the predetermined intervals τ until it is supplied with a measuring completion signal from the CNC CPU 25 (Step G6). The operation control for the measuring operation is executed by the CNC CPU 25 in the manner known in the art, based on the measuring conditions set and stored in the nonvolatile memory 24, i.e., the screw rotational speed switching positions, the set screw rotational speed at each of the screw rotational speed switching positions, the set back pressure, etc.; therefore, detailed description thereof is omitted.

After executing the abnormal measuring detection processing at the predetermined intervals is started, the PMC CPU 18 first reads a current position X of the screw 2 and a present value Ii of the driving current of the screw rotating servomotor M2, respectively, from the current position register and driving current register in the memory 19 (Steps S1–S2). Then, the PMC CPU 18 adds the square of the present driving current value Ii to the value of the squared current value accumulating register Σ and stores the result therein (Step S3), obtains a torque value V presently acting on the screw 2, by multiplying the present driving current value Ii by a predetermined coefficient (Step S4), and initializes the value of an address search index j to "0" (Step S5).

Subsequently, while successively increasing the value of the address search index j, the PMC CPU 18 accesses the jth and (j+1)th addresses of the allowable value storage file to detect the address j at which the upper and lower limits of the allowable range for the screw rotating force corresponding to the current screw position X are stored (Steps S6–S7), and determines whether the torque V presently acting on the screw 2 is between lower and upper limit values Lj and Uj (Step S8).

If the torque V is between the lower and upper limit values Lj and Uj, it is judged that measuring and plasticization are carried out normally, and the abnormal measuring detection processing for the present period is ended. On the other hand, if the torque V is outside the range defined by the lower and upper limit values Lj and Uj, then it is judged that the measuring or the plasticization is abnormal, and an alarm message is displayed on the display screen of the manual data input device 29 or the operation of the injection molding machine is stopped (Step S9).

Insufficient heating of the injection cylinder 1, intrusion of foreign matter or the like is detected from an increase of the torque V exceeding the upper limit value Uj, and insufficient supply of resin, etc. is detected by a decrease of the torque V below the lower limit value Lj. Since the upper limit value Uj is set to a value smaller than or equal to the screw breakdown torque calculated according to of the strength material, any excessive rotating force acting on the screw 2 will never be overlooked.

Thereafter, until measuring operation is completed, the PMC CPU 18 repeatedly executes the aforementioned abnormal measuring detection processing in each predetermined period τ, to detect abnormal measuring or plasticization on the bases of the upper and lower limits Uj and Lj related to the current screw position X, as well as to add the squared value of present instantaneous driving current Ii, detected in each predetermined period τ, to the value of the squared current value accumulating register Σ and store the result in the register, thereby updating the values which are required for obtaining the values of electric energy consumption W, average power consumption Q, average driving current Ic, etc.

When the screw 2 is retreated to the measuring completion position P2 and the measuring completion signal is outputted from the CNC CPU 25, the PMC CPU 18 terminate the control for the measuring operation, and the abnormal measuring detection processing, and causes the injection molding machine to perform the mold opening operation and the product ejecting operation in the conventional manner (Steps G7–G8).

In Step G9, the PMC CPU 18 reads the value then registered by the cycle time measuring timer Tc, that is, the value representing the time period elapsed from the start of mold closing to completion of the product ejection as a reference molding cycle time. Then, based on the value of the winding resistance R of the screw rotating servomotor M2 and the value of the processing period τ, both stored in the nonvolatile memory 24, and the present value of the squared current value accumulating register Σ, the PMC CPU 18 performs an arithmetic operation corresponding to equation (1) to obtain a value of electric energy W consumed by the screw rotating servomotor M2 during the measuring operation of the present molding cycle. Further, based on the values of electric energy W and elapsed time Tc, the PMC CPU 18 performs an arithmetic operation corresponding to equation (2) to obtain average power consumption Q during the elapsed time Tc, and displays the values of the electric energy W and average power consumption Q on the display screen of the manual data input device 29 (Step G10).

Subsequently, the PMC CPU 18 performs an arithmetic operation corresponding to equation (3), based on the values τ, Σ and Tc to obtain a value of average driving current Ic during the elapsed time Tc after the start of mold closing operation, and compares the obtained value with the rated continuous current value Arat of the screw rotating servomotor M2 stored in the nonvolatile memory 24, thereby determining whether the screw rotating servomotor M2 will be overheated if the subsequent molding cycle is immediately started (Step G11). If the average driving current value Ic during the elapsed time Tc is smaller than the rated continuous current value Arat of the screw rotating servomotor M2, and thus it is judged that there is no possibility of the screw rotating servomotor M2 being overheated, the PMC CPU 18 ends the entire sequential control for the present molding cycle, and then repeatedly executes the above-described sequential control until it is supplied with a molding operation stop command from the control panel.

On the other hand, when the average driving current value Ic during the elapsed time Tc is greater than the rated continuous current value Arat of the screw rotating servomotor M2, and thus the result of the decision in Step G11 is No, that is, when a substantial overheating prediction signal is outputted, the screw rotating servomotor M2 will possibly be overheated if the subsequent molding cycle is immediately started. In this case, the PMC CPU 18 performs an arithmetic operation corresponding to expression (6), based on the values τ, Σ and Arat, to obtain a value of cycle time Tadd required to avoid such overheating (Step G12). The PMC CPU 18 then waits until the present value of the cycle time measuring timer Tc, i.e., the value of the elapsed time Tc after the start of mold closing for the present molding cycle, reaches Tadd, so that the average driving current value during the required cycle time Tadd becomes lower than the rated continuous current value Arat to satisfy the expression (5), thereby preventing the screw rotating servomotor M2 from being overheated (Steps G13–G14), and then starts the subsequent molding cycle.

In this embodiment, the average driving current value is obtained regarding the time period from the start of mold closing to completion of the ejection of a molded product as reference molding cycle time, and if the average driving current value obtained at the time of completion of ejection of the molded product is greater than the rated continuous current value Arat, the required molding cycle time is further prolonged by Toff, thereby preventing overheating of the screw rotating servomotor M2. In the case where there is a possibility of the thermal equilibrium of the mold being affected due to the setting of the waiting time or in the case where the molding cycle is not preferred to be prolonged, Steps G12 to G14 will be omitted and, instead, an alarm message or the like may be displayed on the display screen of the manual data input device 29.

According to the present invention, when the screw rotating force applied during the measuring operation deviates from the allowable range set with respect to the reference screw rotating force required for normal measuring operation, an abnormality detection signal is automatically outputted. Therefore, insufficient heating of the injection cylinder, intrusion of foreign matter into the molding material, insufficient supply of the resin, etc. can be detected without being overlooked. Further, since the upper limit of the allowable range set with respect to the reference screw rotating force is always restricted to a value smaller than or equal to the screw breakdown torque, an excessive rotating force acting on the screw cannot be overlooked. Thus, even in the case where the maximum output torque of the motor exceeds the practical strength of the screw or, in the case where a screw of smaller diameter has to be used for measuring operation instead of the used screw, the screw can be prevented from being broken.

Also, according to the present invention, it is possible to learn the electric power and electric energy consumed by the measuring, thus facilitating estimation of the cost of electric power necessary for the molding. Since only the electric power and electric energy consumed for the measuring can be detected separately from those consumed for other operations, the molding work can be rationalized by optimizing the measuring conditions.

Furthermore, when the average driving current of the screw rotating motor becomes greater than the rated continuous current value, the overheating estimation signal is automatically outputted, making it possible to prevent the overheating. When overheating is expected, the molding cycle time is automatically prolonged to prevent the motor from being overheated, thereby allowing the molding operation to be continued to achieve a high-efficiency unmanned molding operation.

We claim:

1. A plasticization control method for an injection molding machine in which resin in an injection cylinder is plasticized and measured by rotating a screw, the method comprising the steps of:
   (a) determining a reference screw rotating force as a reference of rotating force of said screw in a measuring operation, wherein said step (a) includes the step of determining said reference screw rotating force for each of a plurality of positions of said screw in the injection cylinder;
   (b) setting and storing an allowable range with respect to said reference screw rotating force, wherein said step (b) includes the step of setting and storing said allowable range for each of said plurality of positions of said screw in said injection cylinder;
   (c) successively detecting the rotating force of said screw and determining whether or not the detected rotating force is within said allowable range, during execution of the measuring operation; and
   (d) outputting an abnormality detection signal when the rotating force of said screw deviates from said allowable range.

2. The plasticization control method according to claim 1, wherein said step (a) includes the step of determining said reference screw rotating force based on the shape and dimensions of said screw, kind of resin to be used, and measuring conditions.

3. The plasticization control method according to claim 2, wherein said step (b) includes the steps of obtaining an applicable screw rotating force corresponding to strength of said screw; and resetting an upper limit of said allowable range lower than or equal to said applicable screw rotating force when the upper limit of said allowable range exceeds said applicable screw rotating force.

4. The plasticization control method according to claim 1, wherein said step (a) includes the steps of obtaining an applicable screw rotating force corresponding to strength of the screw; carrying out measuring operation with the screw rotating force restricted to said applicable screw rotating force or lower; and determining said reference screw rotating force to be a screw rotating force detected during the measuring operation.

5. A plasticization control method for an injection molding machine in which resin in an injection cylinder is plasticized and metered by rotating a screw, the method comprising the steps of:

(a) detecting a driving current of a motor for rotating said screw in a measuring operation;

(b) obtaining and visually displaying an amount of electric power and/or an average of electric power consumed in one molding cycle;

(c) obtaining an average driving current value in one molding cycle based on the driving current of said motor and a molding cycle time;

(d) determining whether or not said average driving current value exceeds a rated continuous current value of said motor;

(e) outputting an overheating prediction signal when said average driving current value exceeds said rated continuous current value; and (f) carrying out the molding operation with a molding cycle time, obtained by adding a waiting time to said molding cycle time, when the overheating prediction signal is outputted in said step (e).

6. A plasticization control method for an injection molding machine in which resin in an injection cylinder is plasticized and metered by rotating a screw, the method comprising the steps of:

(a) detecting a driving current of a motor for rotating said screw in a measuring operation;

(b) obtaining an average driving current value during a reference molding cycle time from start of mold closing to completion of ejection of a molded product;

(c) determining whether or not said average driving current value exceeds a rated continuous current value of said motor; and (d) adding a waiting time to said reference molding time so that said average driving current value is lower than or equal to said rated continuous current value of the motor when it is determined that said average driving current value exceeds said rated continuous current value, and starting a subsequent molding cycle.

7. The plasticization control method according to claim 1, wherein said step (a) includes the step of determining said reference screw rotating force based on the shape and dimensions of said screw, kind of resin to be used, and measuring conditions.

8. The plasticization control method according to claim 1, wherein said step (a) includes the steps of obtaining an applicable screw rotating force corresponding to strength of the screw; carrying out measuring operation with the screw rotating force restricted to said applicable screw rotating force or lower; and determining said reference screw rotating force to be a screw rotating force detected during the measuring operation.

* * * * *